May 22, 1951 W. V. CZARNECKI, JR., ET AL 2,554,016
FUEL OIL FILTER
Filed April 7, 1948 2 Sheets-Sheet 1
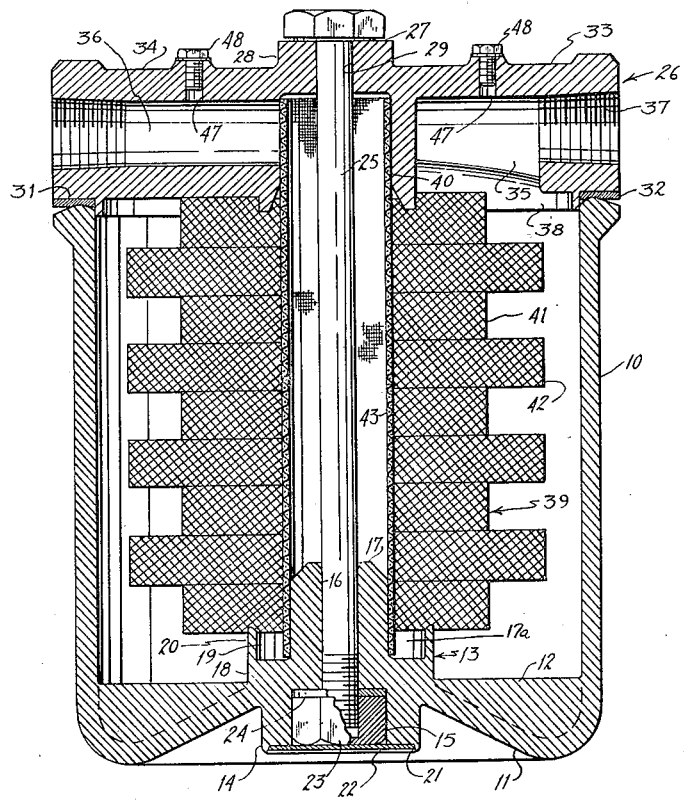
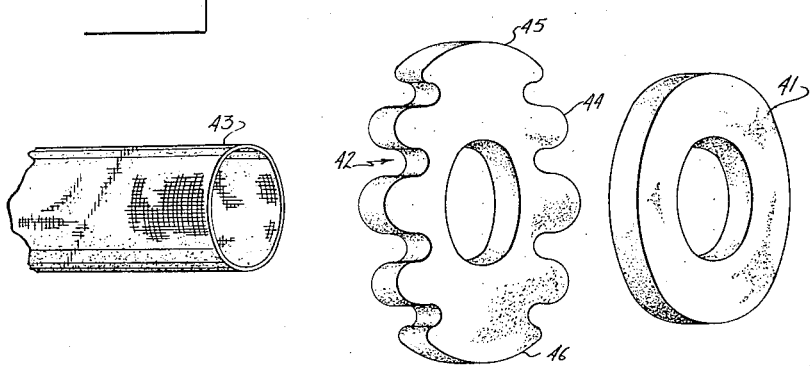
INVENTOR.
WALTER V. CZARNECKI JR. &
CASIMER M. CZARNECKI
BY
THEIR ATTORNEY May 22, 1951 W. V. CZARNECKI, JR., ET AL 2,554,016
FUEL OIL FILTER
Filed April 7, 1948 2 Sheets-Sheet 2
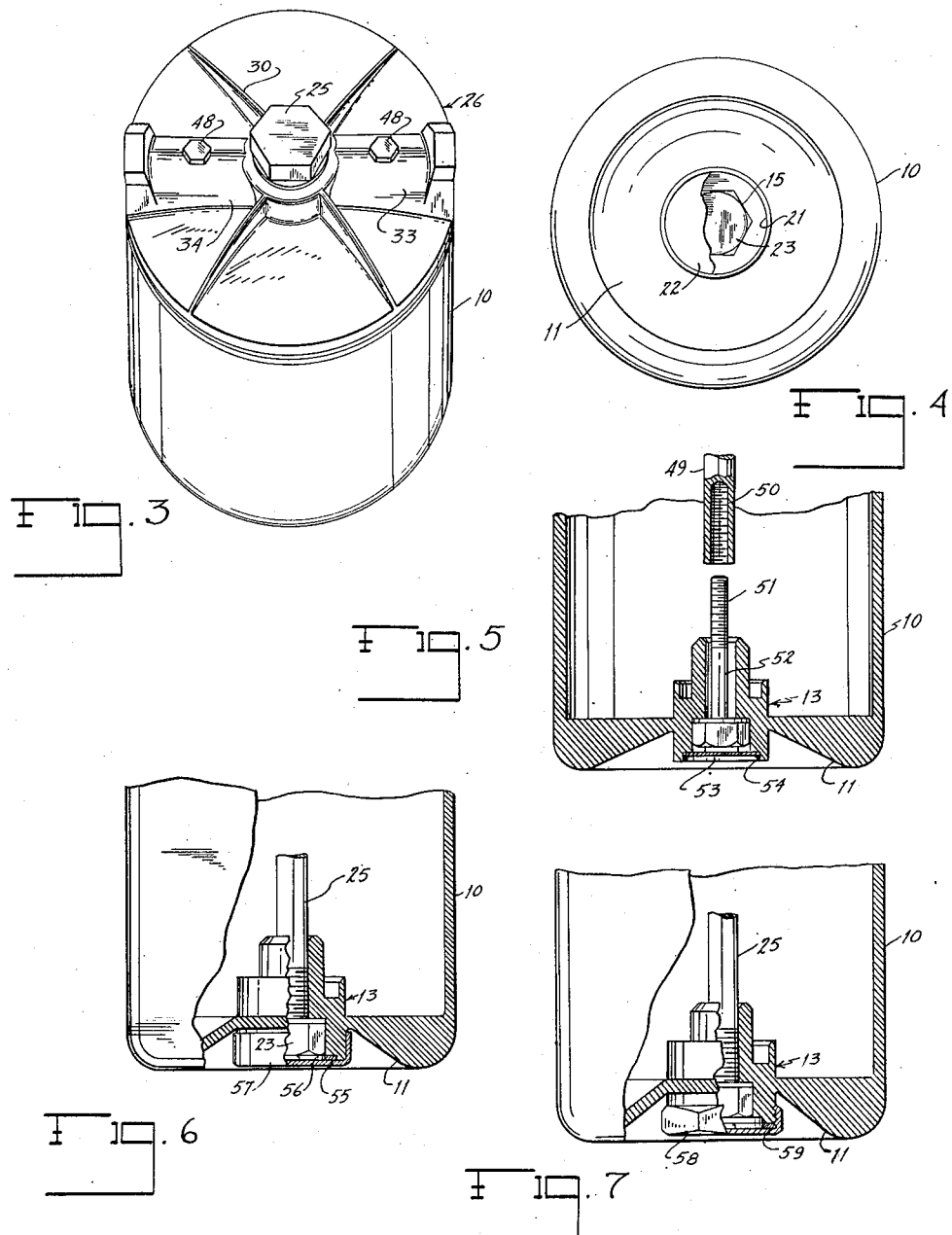
INVENTOR.
WALTER V. CZARNECKI JR. &
CASIMER M. CZARNECKI
BY
THEIR ATTORNEY Patented May 22, 1951

2,554,016

UNITED STATES PATENT OFFICE 2,554,016

FUEL OIL FILTER

Walter V. Czarnecki, Jr., Cornwells Heights, and Casimer M. Czarnecki, Philadelphia, Pa., assignors to Eddington Metal Specialty Company, Eddington, Pa., a co-partnership consisting of Walter V. Czarnecki, Jr., Stanley Czarnecki, Casimer M. Czarnecki, Wesley Czarnecki, and Wladyslow Czarnecki Application April 7, 1948, Serial No. 19,448

10 Claims. (Cl. 210—179)

This invention relates, in general, to oil filters and more particularly to a fuel oil filter for use with oil burners, space heaters, water heaters and the like.

The principal object of the invention is to provide a fuel oil filter embodying certain desired improvements such as an enlarged filtering area, a simplified means to facilitate replacement of the filter cartridge without breaking the oil line, and a more efficient type of filter cartridge.

Another object of the invention is to provide an improved fuel oil filter of comparatively inexpensive design and construction and permitting quick replacement of parts and the provision of more filtering and sump area.

A further object is the provision of a fuel oil filter of generally improved design and construction and particularly adapted to assure uninterrupted service for oil burners and the like.

With the foregoing and other objects in view, which will appear as the description proceeds, the invention resides in the combination and arrangements of parts, and in the details of construction hereinafter described and claimed, it being understood that various changes in the precise embodiment of the invention herein disclosed may be made within the scope of what is claimed without departing from the spirit of the invention.

The preferred embodiments of the invention are illustrated in the accompanying drawings, wherein:

Figure 1 is a longitudinal or vertical sectional view of an embodiment of the invention and showing the component parts of the device in operative position;

Fig. 2 is a composite, exploded perspective view showing the component parts of the filter cartridge assembly;

Fig. 3 is a perspective view of the device as viewed exteriorly;

Fig. 4 is a bottom view of same;

Fig. 5 is a fragmentary vertical sectional view of a modified form of the invention, with parts omitted for clarity of illustration;

Fig. 6 is a fragmentary, vertical sectional view of a modified form of the invention shown in Figs. 1 to 4 inclusive, and with parts broken away and omitted; and, Fig. 7 is a fragmentary, vertical sectional view, showing a modified form or variation of the invention depicted in Fig. 6.

Referring now in detail to the drawings wherein similar characters of reference indicate corresponding parts in the several views of the preferred forms of the invention, the numeral 10 designates generally the body member or container of a fuel oil burner embodying the invention and having a reentrant bottom closure 11 with internal reinforcing ribs 12 radially extending from its center or hub 13 to the adjacent inner periphery of the body member.

The hub 13 of the bottom closure, is outwardly protruded from the exterior periphery thereof to form a boss 14 which has a polygonal or hexagonal recess or pocket 15 which communicates with a bore 16 formed in a tube 17 projecting inwardly and cast unitary with a centrally positioned, internal boss 18 extending into the interior of the body member 10. An annular pocket 17a between the outer surface of the tube 17 and the inner periphery of an annular projection 20 of the internal boss 18, serves as a seat for the screen of the filter cartridge assembly, as hereinafter described more fully.

As best shown in Figures 4 and 5, the outer boss 14 is further provided with a shallow pocket or recess 21 on its lowermost surface with a view to accommodating an expansion plug 22 that is press-fitted or driven therein and which serves to retain a hexagon nut and washer 23, 24 respectively on the threaded end of a screw bolt 25 which secures the cover, designated generally at 26, to the body member 10. The hexagon shaped head of the screw bolt 25 is juxtaposed against a washer 27, in turn seated on a central boss or hub portion 28 of the cover, the said boss 28 being apertured as at 29 to receive the shank of the screw bolt.

The cover 26, as best shown in Figure 3, is exteriorly reinforced by radially extending ribs, as at 30, which integrally joins its hub 28. The under side of the rim of the cover is provided with a circumferential shoulder, as at 31, which serves as a seat for a gasket 32 normally seated on the upper edge or lip of the body member 10.

As best shown in Figure 1, the cover further comprises a pair of radially extending, aligned hollow protrusions 33, 34 which provide channels or passageways 35, 36 for fuel oil. The passageway 35 of the protrusion 33 has a threaded portion, as at 37, to receive an adjacent threaded end of an inlet pipe (not shown), and has a portion of its lower wall cut away, as at 38, to permit the fuel oil to flow into the interior of the body member 10 and into contact with the filter cartridge assembly, designated generally at 39. The hollow protrusion or tube 34 provides an outlet channel 36 which communicates with a pocket 40 in a tubular depending extension formed integrally with the cover. The pocket 40 is in aligned, concentric relation with the hole 29 through which the screw bolt 25 is passed.

The filter cartridge assembly 39 is composed of a plurality of concentrically arranged and superposed felt or fabricated filter elements or washers 41, 42 (Fig. 2). The filter elements 41 are substantially circular or disc-like with a central hole to accommodate a cylindrical screen or filtering medium 43. The filter elements 42, in accordance with this invention, are of a somewhat oval shape and have edges or margins configured to provide a series of convolutions as at 44 which terminate on either side in opposed, arcuately shaped oval end sections 45, 46. The convolutions 44 and end sections 45, 46 it is to be understood, are designed and adapted to increase the effective absorbing and filtering area of the cartridge assembly as a whole. Vents or ducts 47 in the cover 26 are normally closed by cap screws 48.

Inspection of Figure 1 will disclose the manner in which fuel oil entering the inlet channel 35 of the cover 26, will flow into the inner compartment of the body member 10 via the opening 38 and thence pass through the pores of the juxtaposed series of filter elements 41, 42 and then through the wire mesh of the cylindrical screen 43, from which point the fuel oil will flow outwardly through the outlet channel 36. It is to be understood, that the screw bolt 25, as illustrated in Figure 1, will clampingly secure the cover 26 and the associated filter elements in the operative compressed condition indicated, so that the fuel oil will flow only through the pores of the filter elements themselves and then through the screen 43.

The modified form of the invention shown in Figure 5, so far as the cover and body member are concerned, is substantially identical with that described above and illustrated in Figures 1 to 4 inclusive. In the instant form, the screw bolt of the first form of the invention is replaced by a screw bolt 49 having the lower portion of its shank recessed to provide a threaded pocket 50 adapted to engage the threaded stem 51 of a screw bolt 52 whose hexagonal head 52a is non-rotatably received in the correspondingly configured hexagonal pocket in the hub portion of the bottom closure of the body member. A plug 53 soldered or welded, as at 54, to the adjacent periphery of the hexagonal pocket, serves to sealingly retain the screw bolt 52 in the position shown.

Figure 6 shows a slightly modified form of the arrangement disclosed in Figures 1 to 4 inclusive. In the present embodiment, the hexagon nut 23 on the screw bolt 25 is juxtaposed against a gasket 55 arranged in a circular recess 56. A cap 57 press-fitted on the outer periphery of the boss section of the bottom closure, sealingly retains the screw bolt 25 and the associated gasket in the operative position shown.

The form of the invention disclosed in Figure 7 differs from that shown in Figure 6 by replacing the cap 57 therein with a screw cap 58 which is juxtaposed against a gasket 59 arranged against the bottom edge of the boss section. As herein illustrated, the hexagon nut 23 and gasket 59 may be removed or replaced, when desired, by merely taking off the screw cap 58.

The function and mode of operation of the device has been in large measure indicated from the foregoing description but may be summarized as follows:

Fuel oil from the source of supply will be conducted to the inlet channel 35 and thence into the chamber of the body member from whence, under pressure, it will pass through the filter cartridge assembly 39 and screen 43 into the outlet channel or passageway 36 and then to the attached oil burner (not shown). The enlarged absorption and filtering area provided by the novel configuration of the convoluted filter elements 42 of the cartridge assembly is particularly adapted to increase the life and efficiency of the said cartridge. In conjunction with this filter cartridge, the design and construction of the hub section of the bottom closure, provides an enlarged sump area and a convenient efficient means for retaining the screw bolt assembly and consequently the cover in the operative position illustrated, while permitting the quick removal of the said cover and the filter cartridge when desired or necessary.

It is to be understood that the invention is susceptible of modification and change, and is not limited to the precise details as set forth; reference being had to the appended claims rather than to the foregoing description to indicate the scope of the invention.

What we claim is:

1. In a fuel oil filter of the kind described, a body member, a bottom secured to the body member, the bottom being provided with a recess in the outer face thereof, a nut arranged in the recess, a filter cartridge assembly arranged in the body member, a projection secured to the inner face of the bottom and extending into one end of the cartridge assembly, a cover normally seated on the body member and the cover being provided with a pocket receiving the other end of the cartridge assembly, an inlet channel arranged in the cover and communicating with the interior of the body member, an outlet duct formed in the cover and communicating with the pocket, and a screw bolt protrudable through the cover and body member and operatively engageable with said nut.

2. A fuel oil filter of the kind described, comprising a body member, a bottom closing said body member at one end, a boss integral with said body member and protruding inwardly and outwardly therefrom, means in said boss to accommodate a screw bolt, a nut threadedly engaged on said bolt and located within said means, a cylindrical screen encircling a tubular projection on said boss, a plurality of filter washers encircling said screen, said boss having an annular pocket receiving a lower portion of the screen, a cover normally seated on the upper edge of the body member and formed with a pocket, said cover having a pair of aligned channels, one of said channels communicating by way of said pocket in the cover with one side of said filter washers, the other of said channels communicating by way of the body member with the other side of said filter washers, and venting ducts arranged on said cover and communicating with said channels.

3. In a fuel oil filter of the kind described, in combination, a body member, a filter cartridge arranged within the body and having a screen, a tubular projection arranged on the body member and insertable in the screen, an annular pocket formed between the exterior periphery of the tubular projection and an integral extension thereof, said pocket receiving one end of the screen, said integral extension supporting the filter cartridge, a cover seated on the body member, inlet and outlet channels arranged in the cover and adapted to conduct fuel oil into and out of said body member, and means to detachably secure the cover on the body member.

4. In a fuel oil filter of the kind described, in combination, a body member, a filter cartridge arranged within the body and having a screen, a tubular projection arranged on the body member and insertable in the screen, an annular pocket formed between the exterior periphery of the tubular projection and an integral extension thereof, said pocket receiving one end of the screen, said integral extension supporting the filter cartridge, a cover seated on the body member, inlet and outlet channels arranged in the cover and adapted to conduct fuel oil into and out of said body member, a noncircular recess arranged on the bottom of the body member, a nut having a shape corresponding to that of said recess and located in said recess, and a member threadedly engaged with said nut and effective to clampingly secure the cover to the body member.

5. In a fuel oil filter of the kind described, in combination, a body member, a filter cartridge arranged within the body and having a screen, a tubular projection arranged on the body member and insertable in the screen, an annular pocket formed between the exterior periphery of the tubular projection and an integral extension thereof, said pocket receiving one end of the screen, said integral extension supporting the filter cartridge, a cover seated on the body member, inlet and outlet channels arranged in the cover and adapted to conduct fuel oil into and out of said body member, a polygonal recess arranged on the bottom of the body member, a polygonal nut arranged in the recess, a plug fastened to the body member and sealingly enclosing the nut within the recess, and a screw bolt threadedly engaging said nut and effective to secure the cover in clamping relation with the filter cartridge and the body member.

6. In a fuel oil filter of the kind described, in combination, a body member, a bottom closing said member at one end, a hub on said bottom, a tubular extension protruding inwardly from the hub, an annular lip integral with the hub and encircling said tubular extension, an annular pocket arranged between said lip and tubular extension, a filter cartridge seated on said lip, a screen forming a part of the cartridge and located at the center thereof, said screen having its lower end arranged in the annular pocket, a recess arranged in an exterior portion of the hub, a nut located and secured against rotation in said recess, a cover arranged on the body member and having inlet and outlet passageways communicating with opposite sides of said filter cartridge, a tubular extension projecting from the under side of the cover and receiving an upper portion of said screen, and threaded means engaging said cover and nut, said threaded means serving to detachably and clampingly secure the cover compressingly on the filter cartridge and the cover.

7. In a fuel oil filter of the kind described and having a body member, a filter cartridge within the body member, and a cover arranged on the body member and having inlet and outlet channels communicating with the interior of said body member; the combination with said body member of a bottom closure therefor, said bottom closure having a hub, a recess formed exteriorly in the hub and receiving a nut, a tubular projection and an annular pocket formed on the inner side of the hub, said projection and annular pocket operatively receiving said filter cartridge; and a screw bolt projecting through the cover and the body member and engageable with the nut to retain the body member, filter cartridge and cover in operative relation.

8. The combination with an oil filter having a body member and a filter cartridge within said body member and a cover arranged on said body member and said cover having inlet and outlet channels communicating with the interior of said body member of a means for increasing the sump area of said filter and for insuring quick removal of said filter cartridge, said means comprising a bottom in the shape of a cone, the larger end of said conically shaped bottom being secured to said body member and the smaller end of said conically shaped bottom projecting inwardly into said body member, a plurality of ribs arranged in radially spaced relation with respect to each other and extending from said smaller end of said conically shaped bottom toward said larger end of said conically shaped bottom and secured to said body member, a bolt connected to said cover and having its threaded end extending through said bottom, and a nut secured to said threaded end of said bolt.

9. In a fuel oil filter, a body member having one end open, a bottom secured to the other end of said body member, a plurality of disk-shaped filtering elements arranged in parallel spaced relation with respect to each other and positioned inside said body member, a plurality of oval-shaped filtering elements arranged in parallel spaced relation with respect to each other and positioned between and in abutting relation with said disk-shaped filtering elements, said oval-shaped filtering elements being of a greater cross-sectional area than said disk-shaped filtering elements and said plurality of oval-shaped filtering elements and said plurality of disk-shaped filtering elements being positioned longitudinally in said body member, a cover positioned over said open end of said body member, said cover being provided with an inlet channel therein in communication with the interior of said body member and said cover being provided with an outlet channel therein in communication with said filtering elements, and means securing said cover to said body member.

10. In a fuel oil filter, a body member having one end open, a bottom secured to the other end of said body member, a plurality of disk-shaped filtering elements arranged in parallel spaced relation with respect to each other and positioned inside said body member, a plurality of oval-shaped filtering elements arranged in parallel spaced relation with respect to each other and positioned between and in abutting relation with said disk-shaped filtering elements, said oval-shaped filtering elements being of a greater cross-sectional area than said disk-shaped filtering elements and said plurality of oval-shaped filtering elements and said plurality of disk-shaped filtering elements being positioned longitudinally in said body member, a filtering medium projecting through all of said filtering elements, one end of said filtering medium seating against said bottom, a cover positioned over said open end of said body member, said cover being provided with an inlet channel therein in communication with the interior of said body member and said cover being provided with an outlet channel therein in communication with the interior of said body member and in communication with the other end of said filtering medium, and means securing said cover to said body member.

WALTER V. CZARNECKI, Jr.
CASIMER M. CZARNECKI.

REFERENCES CITED

The following references are of record in the file of this patent:

UNITED STATES PATENTS

| Number | Name | Date |
|---|---|---|
| 1,017,867 | Goldman | Feb. 20, 1912 |
| 1,579,205 | Blakesley et al. | Apr. 6, 1926 |
| 1,580,470 | Duby | Apr. 13, 1926 |
| 1,647,799 | Hammer | Nov. 1, 1927 |
| 1,702,489 | Bassett | Feb. 19, 1929 |
| 2,208,033 | Aldham | Apr. 14, 1942 |
| 2,339,703 | Kamrath | Jan. 18, 1944 |
| 2,367,873 | Kasten | Jan. 23, 1945 |
| 2,389,431 | Hallinan | Nov. 20, 1945 |

FOREIGN PATENTS

| Number | Country | Date |
|---|---|---|
| 2,931 | Great Britain | 1897 |
| 35,110 | France | June 18, 1929 |
| | (1st addition to 643,172) | |
| 802,427 | France | June 6, 1936 |
| 882,093 | France | Feb. 15, 1943 |